(12) United States Patent
Ishikawa et al.

(10) Patent No.: US 6,329,460 B1
(45) Date of Patent: Dec. 11, 2001

(54) POLYSILOXANE COMPOSITION AND RUBBER COMPOSITION AND RESIN COMPOSITION

(75) Inventors: Kazunori Ishikawa; Fumito Yatsuyanagi; Hiroyuki Kaido; Naoya Adachi, all of Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 09/547,230

(22) Filed: Apr. 11, 2000

(30) Foreign Application Priority Data

Apr. 16, 1999 (JP) .................................................. 11-109675
Apr. 30, 1999 (JP) .................................................. 11-124043

(51) Int. Cl.⁷ ................................................ C08K 5/5419
(52) U.S. Cl. .................... 524/506; 524/265; 524/266; 525/100; 525/393; 525/446; 528/29
(58) Field of Search ...................... 524/506, 265, 524/266, 765, 492; 525/100, 393, 446; 528/29

(56) References Cited

U.S. PATENT DOCUMENTS

| | | | |
|---|---|---|---|
| 4,503,181 | * | 3/1985 | Kato et al. . |
| 5,352,751 | * | 10/1994 | Cocco . |
| 6,015,850 | * | 1/2000 | Nakamura et al. . |
| 6,103,811 | * | 8/2000 | Midorikawa et al. . |
| 6,180,703 | * | 1/2001 | Onoi et al. . |

FOREIGN PATENT DOCUMENTS

| | | |
|---|---|---|
| B-20552/95 | 12/1995 | (AU) . |
| 09169847 | 6/1997 | (JP) . |
| 09328613 | 12/1997 | (JP) . |
| 10212354 | 8/1998 | (JP) . |

* cited by examiner

*Primary Examiner*—Robert Dawson
*Assistant Examiner*—Marc S. Zimmer
(74) *Attorney, Agent, or Firm*—Arent Fox Kintner Plotkin & Kahn, PLLC

(57) ABSTRACT

A polysiloxane composition comprising (i) an alkoxysilyl group-containing polysiloxane containing at least six siloxane structures having the following formula (I) in a molecule

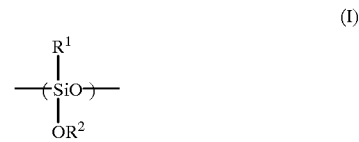

wherein $R^1$ represents a methyl group, ethyl group or phenyl group, and $R^2$ represents a group selected from the group consisting of hydrocarbon group and ether bond-containing hydrocarbon groups having 1 to 6 carbon atoms; and (ii) an alcohol having the formula $$R^4(OR^5)_p\text{—OH}$$

wherein $R^4$ represents a $C_1$–$C_{18}$ alkyl group, a phenyl group or a benzyl group, $R^5$ represents $C_1$–$C_6$ alkylene group and p is an integer of 0–20.

3 Claims, No Drawings

POLYSILOXANE COMPOSITION AND RUBBER COMPOSITION AND RESIN COMPOSITION

BACKGROUND OF THE INVENTION

1. Field of the Invention

The present invention relates to a polysiloxane composition and a rubber composition containing a surface-treated inorganic solid particle treated, on the surface thereof, with the same well as a resin composition containing a resin, an inorganic filler and a polysiloxane suitable for use as a paint, adhesive, sealant, etc. due to a superior stability of dispersion of a filler.

2. Description of the Related Art

In the past, inorganic solid particles such as carbon black, calcium carbonate, alumina, aluminum sulfate, barium sulfate, calcium sulfate, silica, talc, clay, diatomaceous earth, and mica have been used in numerous fields such as rubber, cosmetics, synthetic resins, paints, adhesives, and magnetic tape. Among these, inorganic solid particles are extensively used as fillers for various types of rubber. These inorganic solid particles sometimes have polar groups on their surface. The inclusion of inorganic solid particles is problematic in that it causes a drop in the knit of the mix with the rubber. Rubber compositions containing metal oxides containing silica, in particular silica, among these inorganic solid particles are used for tire tread rubber compositions low in heat buildup and superior in abrasion resistance. Rubber compositions containing silica are problematic in that the viscosity at the time before vulcanization rises, the vulcanization is delayed, and the knit of the mix falls and the productivity consequently deteriorates. Further, in a rubber composition containing silica, poor dispersion of the silica occurs and the properties of the silica are not sufficiently utilized.

To solve the above problem, the present inventors previously found that the unvulcanized physical properties and vulcanized physical properties of the rubber composition containing silica can be improved by blending an alkoxysilyl group-containing polysiloxane in a rubber composition containing silica, whereby a reaction between the silanol groups on the surface of the silica and alkoxysilyl groups is caused to thereby cover the surface of the silica (see Japanese Unexamined Patent Publication (Kokai) No. 9-111044). However, it was found that, when the polysiloxane is stored for a long period, an increase in the viscosity is seen and the improvement in the unvulcanized physical properties and vulcanized physical properties in a rubber composition containing silica using such a polysiloxane is small.

In addition, resin compositions for paints, adhesives, sealants, etc. use pigments and other fillers for coloring, blocking, reinforcement, extension, imparting weather resistance, or imparting conductivity, a magnetic property, or other properties. Fillers are classified into inorganic fillers and organic fillers, but the former is generally low in affinity with various resins, and therefore, poor dispersion, aggregation, settling, etc. easily occur and, in turn, painting or installation become impossible, uneven coloring, blocking, etc. occur, and other problems arise.

Among the inorganic fillers, silica is used in paints as an extender pigment or delustering agent and is used in adhesives for improvement of the hardness etc., but due to the aggregating force arising from the silanol groups on the surface, poor dispersion and settling in particular easily occur or, once precipitating, redispersion is extremely difficult.

To solve this problem, various dispersants and anti-settling agents for use for paints, adhesives, sealants, and other resin compositions have been studied in the past.

For example, Japanese Unexamined Patent Publication (Kokai) No. 5-163463 describes that a "condensate of an organoalkoxysiloxane having the general formula:

$$RSi(OR')_3$$

where R represents a $C_1$ to $C_8$ organic group and R' represents a $C_1$ to $C_5$ alkyl group or $C_1$ to $C_4$ acyl group, i.e. an organosiloxane having a weight average molecular weight converted to polystyrene of 3,000 to 100,000" improves the dispersion of the pigment and acts as a condensing agent in a coating composition.

However, in the above system, dual use of colloidal silica is essential. Further, the publication does not describe anything about the effect of an organopolysiloxane as a dispersant and anti-settling agent in a coating composition where the pigment is silica and does not solve the problem of poor dispersion, aggregation, settling, and difficult redispersion of silica.

SUMMARY OF THE INVENTION

Accordingly, the objects of the present invention are to solve the above-mentioned problems and to provide a polysiloxane superior in storage stability, surface-treated inorganic solid particles giving good unvulcanized physical properties and vulcanized physical properties and improved abrasion resistance when blended in a rubber, and a rubber composition containing the same and superior in processability when unvulcanized, low heat buildup of the vulcanized product, abrasion resistance, and other properties.

Accordingly, another object of the present invention is to provide a resin composition containing an inorganic filler which is superior in the stability of dispersion of the inorganic filler, etc.

The present inventors found that, when adding a specific polysiloxane to a resin composition for a paint, adhesive, sealant, etc., it is possible to make poor dispersion, aggregation, settling, etc. of the filler harder to occur and enable easy redispersion of the filler by stirring etc. when it settles, whereby the present invention has been completed.

In accordance with the present invention, there is provided a polysiloxane composition comprising (i) an alkoxysilyl group-containing polysiloxane containing at least six siloxane structures having the following formula (I) in a molecule:

(I)

wherein $R^1$ represents a methyl group, ethyl group or phenyl group, and $R^2$ represents a group selected from the group consisting of hydrocarbon group and ether bond-containing hydrocarbon groups having 1 to 6 carbon atoms; and (ii) an alcohol having the formula $$R^4(OR^5)_n\text{—OH}$$

wherein $R^4$ represents a $C_1$–$C_{18}$ alkyl group (e.g., a methyl, ethyl, propyl, butyl, hexyl, pentyl, heptyl, octyl, octadecyl group), a phenyl group or a benzyl group, $R^5$ is $C_1$–$C_6$ alkylene group (e.g., a methylene group, ethylene group, propylene group, butylene group, penten group, hexene group) and n is an integer of 0–20.

The alkoxysilyl group-containing polysiloxane is preferably a compound having the formula (II):

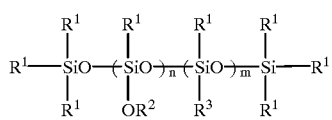

(II)

wherein $R^1$ and $R^2$ are as defined above, $R^3$ represents a group selected from the group consisting of hydrogen atom and organic groups having a molecular weight of not more than 3000, n is an integer of 6 to 1000, and m is an integer of 0 to 100.

Preferably, the present composition contains 1 to 100 parts by weight of the alcohol, based upon 100 parts by weight of the alkoxysilyl group-containing polysiloxane.

Further, the present invention provides a surface-treated inorganic solid particle obtained by surface treating 100 parts by weight of the inorganic solid particle with 1 to 50 parts by weight of the above-mentioned polysiloxane composition.

Further, the present invention provides a rubber composition containing 5 to 100 parts by weight of inorganic solid particles, based upon 100 parts by weight of rubber and 0.1 to 30% by weight, in terms of polysiloxane, of the polysiloxane composition based upon the content of the inorganic solid particle.

Further, the present invention provides a rubber composition containing 5 to 100 parts by weight of the surface-treated inorganic solid particle, based upon 100 parts by weight of the rubber.

Preferably the inorganic solid particle is a metal oxide containing silicon.

In accordance with the present invention, there is further provided a resin composition comprising (A) 100 parts by weight of a resin for a paint or adhesive, (B) 0.5 to 100 parts by weight of an inorganic filler, and (C) 0.1 to 30 parts by weight, based upon 100 parts by weight of the component (B), of a polysiloxane having the following formula (III):

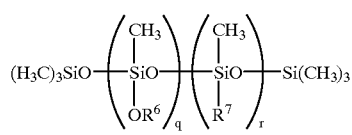

(III)

wherein, $R^6$ is at least one group selected from the group consisting of a methyl group, ethyl group, and propyl group provided that q number of $R^6$'s may be the same or different, $R^7$ is a hydrogen atom or a monovalent organic group and r number of $R^7$'s may be the same or different, q is an integer of 1 or more, and r is 0 or an integer of 1 or more.

Preferably the resin (A) for a paint or adhesive is a resin selected from the group consisting of urethane resins, epoxy resins, acrylic resins, and melamine resins. More preferably, at least silica is contained as the inorganic filler (B).

DESCRIPTION OF THE PREFERRED EMBODIMENTS

The present invention will be described in further detail below.

As explained above, according to the first aspect of the present invention, the alkoxysilyl group-containing polysiloxane is not excellent in storage stability and exhibits a rise in viscosity along with the elapse of time. According to the findings of the present inventors, this is due to the presence of the alkoxysilyl groups. The alkoxysilyl groups undergo a hydrolysis reaction in the presence of water. The silanol groups, produced as a result, condense with the alkoxysilyl groups to produce silicone, and therefore, the viscosity of the alkoxysilyl group-containing polysiloxane is increased.

According to the present invention, since the alcohol $R^4OH$ is blended in an alkoxysilyl group-containing polysiloxane containing at least six siloxane structures having the formula (I) in one molecule, the alkoxysilyl groups have a larger probability of reacting with the alcohol than reacting with water. The alkoxysilyl groups and the alcohol react to produce not silanol groups, but the alkoxysilyl groups in the same way as before the reaction, and therefore, no condensation of the alkoxysilyl groups occurs and, as a result, the storage stability of the alkoxysilyl group-containing polysiloxane is improved. The alkoxysilyl groups produced again by reaction of the alkoxysilyl groups with the alcohol are sometimes the same as and sometimes different from the alkoxysilyl groups before the reaction depending upon the alcohol used.

The polysiloxane used in the polysiloxane composition of the present invention is an alkoxysilyl group-containing polysiloxane containing at least six siloxane structures having the formula (I) in a molecule. The terminal group is not particularly limited and is determined by the type of material used when producing the alkoxysilyl group-containing polysiloxane. For example, it may be a trimethylsilyl group, methyldiphenylsilyl group, triphenylsilyl group, etc.

Further, by including at least six siloxane structures in one molecule, it is possible to cause strong bonding with inorganic solid particles.

In the above formula (I), $R^1$ is a methyl group, ethyl group, or phenyl group. $R^2$ is one of the groups composed of, for example, $C_1$ to $C_6$ hydrocarbon groups and ether bond-containing hydrocarbon groups. As the $C_1$ to $C_6$ hydrocarbon groups, a methyl group, ethyl group, propyl group, butyl group, pentyl group, hexyl group, butadiene residual group, isoprene residual group, etc. may be mentioned. Among these, a methyl group, ethyl group, and propyl group are preferable.

As the ether bond-containing hydrocarbon groups, a $C_1$ to $C_6$ alkyl group containing an ether bond may be mentioned. A methoxyethyl group etc. may be mentioned as a preferable specific example.

The molecule may further contain a hydrogen group or other organic groups (e.g., styrene residual group, octyl group, limonene residual group).

The alkoxysilyl group-containing polysiloxane may be the compound having the formula (II). In the above formula (II), $R^1$ and $R^2$ are synonomous with the $R^1$ and $R^2$ in formula (I).

$R^3$ is a hydrogen group or an organic group having a molecular weight of not more than 3000. As the organic group having a molecular weight of not more than 3000, a polyoxyethylene, polyoxypropylene, polyisobutylene, limonene residual group, styrene residual group, α-methylstyrene residual group, α-methylstyrene dimer residual group, vinylcyclohexene residual group, n-octyl group, isooctyl group, octadecyl group, glycidyloxypropyl group, etc. may be mentioned. These are used according to the type of the resin and the purpose of the application of the composition.

The number n of repeating units is an integer between 6 to 1000, preferably between 6 to 100 and the number m is 0 or an integer of 1 to 100.

The present inventors found that, when silica etc. are blended in the rubber or resin etc., the group attached with m in the compound of formula (II) is not particularly an essential component and a modifying ingredient for rubber or the resin may be added to the polysiloxane (see Japanese Unexamined Patent Publication (Kokai) No. 11-106512). In this case as well, the addition of an alcohol increases the stability of the polysiloxane. In this case, m is preferably an integer of 1 to 100, more preferably an integer of 1 to 50. If m is 1 to 100, that is, if there is the above $R^3$ in the alkoxysilyl group-containing polysiloxane, the effect is obtained that the rubber or resin modifying group in the modifying ingredient may be bonded with the silica etc.

An alkoxysilyl group-containing polysiloxane is contained in the polysiloxane composition of the present invention used for the surface treatment of the inorganic solid particles. In this case, the size is preferably one by which the reactive groups on the surface of the inorganic solid particles, for example, silanol groups on the surface of the silica, react to make the surface of the inorganic solid particles hydrophobic and cause lubrication effect. That is, it should be a polymer (or oligomer) having an average polymerization degree of 3 to 10,000, preferably 10 to 1000.

The alkoxysilyl group-containing polysiloxane may be produced, for example, by the following manner.

The alkoxysilyl group-containing polysiloxane is synthesized by a reaction between a ≡Si—H group-containing polysiloxane and alcohol in the presence of a catalyst.

As the ≡Si—H group-containing polysiloxane, the following may be mentioned.

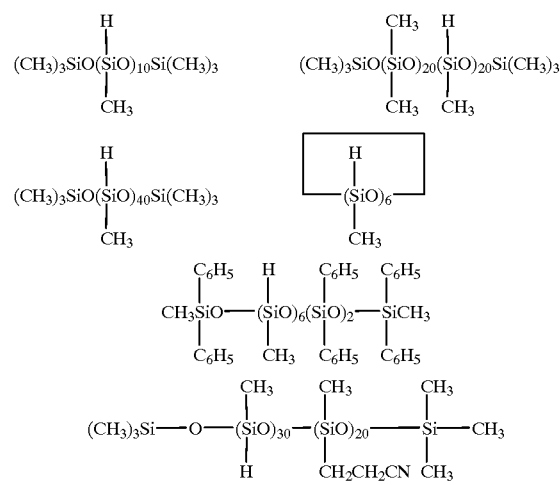

As the above-mentioned alcohol having the formula: $R^4(OR^5)_p$—OH, methanol, ethanol, propanol, butanol, pentanol, heptanol, octanol, octadecanol, phenol, benzyl alcohol, etc. may be mentioned as the alcohol having p=0. Further, as an alcohol having the $OR^5$ group, ethylene glycol monomethyl ether and diethylene glycol monomethyl ether, etc. may be mentioned.

Further, as the above catalyst, chloroplatinic acid, platinum-ether complex, platinum-olefin complex, $PdCl_2(PPh_3)_2$ and $RhCl_2(PPh_3)_2$ may be illustrated.

The alkoxysilyl group-containing polysiloxane is synthesized by causing a reaction between a corresponding ≡Si—H group-containing polysiloxane and a corresponding alcohol in the presence of the above catalyst.

Further, as the method of introducing $R_3$ in the polysiloxane of the above formula (II), the method of causing a corresponding alcohol to react with a corresponding ≡Si—H group-containing polysiloxane in the presence of the above catalyst and then cause a reaction of a corresponding organic group containing a double bond or cause a reaction of these simultaneously.

As another production process of an alkoxysilyl group-containing polysiloxane containing the siloxane structures having the formula (I), it is possible to cause a reaction between a corresponding ≡Si—H group-containing polysiloxane and an alkoxysilane containing a double bond such as shown below in the presence of the above catalyst:

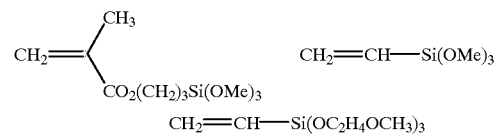

Further, as another process, the alkoxysilyl group-containing polysiloxane may be synthesized by a silanol terminated polysiloxane and alkoxysilane in the presence of a catalyst such as a bivalent tin compound. As this silanol terminated polysiloxane, the following may be illustrated:

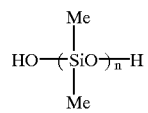

wherein n is 1 to 2000.

As said alkoxysilane, it is possible to mention the following alkoxysilanes. Further, it is possible to mention the silane coupling agent shown in the following Table A.

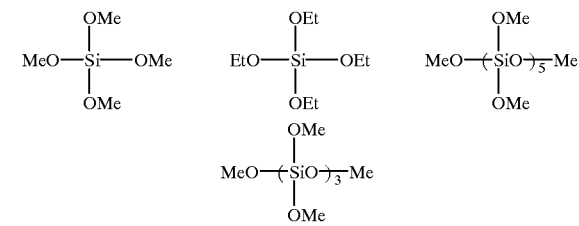

TABLE A

| Chemical name | Structural formula |
|---|---|
| Vinyltrimethoxysilane | $CH_2$=$CHSi(OCH_3)_3$ |
| Vinyltriethoxysilane | $CH_2$=$CHSi(OCH_2CH_3)_3$ |
| Vinyltris (2-methoxyethoxy)silane | $CH_2$=$CHSi(OCH_2CH_2OCH_3)_3$ |
| N-(2-aminoethyl)3-aminopropylmethyl-dimethoxysilane | $H_2NCH_2CH_2NH(CH_2)_3Si(OCH_3)_2$<br>                              $CH_3$ |

TABLE A-continued

| Chemical name | Structural formula |
| --- | --- |
| N-(2-aminoethyl)3-aminopropyltrimethoxysilane | $H_2NCH_2CH_2NH(CH_2)_3Si(OCH_3)_3$ |
| 3-aminopropyltriethoxysilane | $H_2N(CH_2)_3Si(OCH_3)_3$ |
| 3-glycidoxypropyltrimethoxysilane | 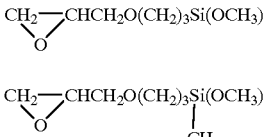 |
| 3-glycidoxypropylmethyldimethoxysilane | 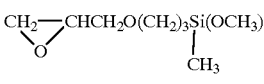 |
| 2-(3,4-epoxycyclohexyl)ethyltrimethoxysilane | 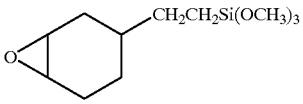 |
| 3-methacryloxypropyltrimethoxysilane | 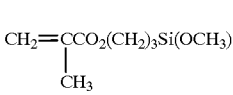 |
| 3-mercaptopropyltrimethoxylsilane | $HS(CH_2)_3Si(OCH_3)_3$ |
| 3-aminopropyltrimethoxysilane | $H_2N(CH_2)_3Si(OCH_2CH_3)_3$ |
| bis-[3-(triethoxysilyl)-p-propyl]tetrasulfide | $[(CH_3CH_2O)_3Si(CH_2)_3]_2\text{-}S_4$ |
| bis-[3-(triethoxysilyl)-p-propyl]disulfide | $[(CH_3CH_2O)_3Si(CH_2)_3]_2\text{-}S_2$ |

The alkoxysilyl group-containing polysiloxane may be synthesized by a reaction between a polysiloxane having a reactive functional group at its side chain or end and a silane coupling agent of Table A. As the polysiloxane having the reactive functional group, one having an epoxy group, amino group, mercapto group, carboxyl group, etc. may be mentioned.

As the alcohol contained in the polysiloxane composition of the present invention, a $C_1$ to $C_6$ alcohol, specifically, methanol, ethanol, propanol, butanol, pentanol, and heptanol may be mentioned. Further, an alcohol having an oxygen atom such as an ethylene glycol monomethyl ether may be illustrated.

The content of the alcohol used in the polysiloxane composition according to the present invention is preferably 1 to 100 parts by weight, more preferably 3 to 50 parts by weight, based upon 100 parts by weight of the alkoxysilyl group-containing polysiloxane. If in this range, it is possible to maintain a good stability of storage of the polysiloxane.

The surface-treated inorganic solid particles of the present invention will now be explained.

The surface-treated inorganic solid particles of the present invention are treated on their surface with the above polysiloxane composition of the present invention.

As explained above, the inorganic solid particles contribute to the improvement of the physical properties of the rubber, but since they may be substances having polar groups on the surface, the knit of the mix with the rubber falls and the processability declines. The physical properties of the rubber composition containing hydrous silica or other silica among these inorganic solid particles are excellent, but there was the defect that the processability before vulcanization was inferior. According to the findings of the present inventors, this is due to the presence of the silanol groups (≡Si—OH) present on the surface of the silica. Structures are formed in the rubber composition and the viscosity rises due to the aggregating force of the silanol, the vulcanization accelerator etc. is absorbed and the vulcanization delayed due to the polarity of the silanol groups, or the compatibility with the nonpolar rubber is not sufficient, and therefore, the integrity of the mixture become worse. Therefore, the processability of the unvulcanized composition is decreased. Further, a rubber composition containing silica is often used, together with a silane coupling agent for reinforcement of the rubber, but silanol groups are present in the cavities of the silica particles. These react with the silane coupling agent to cause a loss of the silane coupling agent and the reinforcement effect is decreased, and therefore, a large amount of a silane coupling agent must be added. In the prior art, diethylene glycol is added etc. However, if a polar substance such as diethylene glycol is added, while the phenomenon of absorption of a polar compounding agent such as a vulcanization accelerator can be prevented to a certain extent, it cannot be completely prevented. Further, the substance chemically bonding with the silica particles, such as the silane coupling agent, could not be prevented from bonding in the cavities.

Therefore, according to the present invention, since the surface of the inorganic solid particles of the present invention are treated with the polysiloxane composition of the present invention, the polar groups on the surface of the inorganic solid particles and the alkoxysilyl groups react and cover the surface of the inorganic solid particles. Thus, the problem of the prior art is solved and the increase in the viscosity of the unvulcanized substance caused by the aggregating force or polarity of the polar groups or wasteful consumption of the polar additives such as the vulcanization accelerators or silane coupling agent can be effectively suppressed.

As the inorganic solid particles according to the present invention, for example, carbon black, calcium carbonate, alumina, aluminum sulfate, barium sulfate, calcium sulfate, silica, diatomaceous earth, mica, silicon oxide, titanium oxide, aluminum oxide, iron oxide, zirconium oxide, cerium oxide, calcium silicate, aluminum silicate, magnesium silicate, zeolite, feldspar, kaolinite, clay, talc, acid clay, calcium bentonite, the silica bonded filler set forth in Japanese Unexamined Patent Publication (Kokai) No. 11-29319, etc. may be mentioned.

Here, as the inorganic solid particles used for rubber formulations, a silicon-containing metal oxide such as anhydrous silicic acid, hydrous silicic acid, calcium silicate, magnesium silicate, aluminum silicate, kaolin, and talc are preferable.

The amount of the surface treatment of the polysiloxane composition of the present invention used in the present invention is 1 to 50 parts by weight, preferably 5 to 20 parts by weight, based upon 100 parts by weight of the inorganic solid particles. If the amount of alkoxysilyl group-containing polysiloxane is too small, the desired effects cannot be obtained, while if too large, substances not bonding with the inorganic solid particles are sometimes seeped or exuded out from the vulcanized substance.

The treating method of the surface of the inorganic solid particles with the polysiloxane composition of the present invention is not particularly limited, but the particles may be obtained by mixing the polysiloxane composition of the present invention with a suitable solvent (for example, acetone, methanol, and ethanol), immersing or coating the particles in the solvent at ordinary temperature, followed by heating and drying at room temperature to 120° C.

The rubber composition of the present invention will now be explained.

The rubber composition of the present invention is a rubber composition containing the surface-treated inorganic solid particles of the present invention.

The rubber blended as the main ingredient in the rubber composition of the present invention may be any type of rubber generally added to various rubber compositions in the past, for example, natural rubber (NR), polyisobutene rubber (IR), various styrene-butadiene copolymer rubbers (SBR), various polybutadiene rubbers (BR), acrylonitrile-butadiene copolymer rubbers (NBR), butyl rubber (IIR), and other diene-based rubbers or ethylene-propylene copolymer rubbers (EPR, EPDM), etc. These rubbers may be used alone or in any mixture thereof.

The amount of the surface-treated inorganic solid particles of the present invention added to the rubber composition is 5 to 100 parts by weight, preferably 10 to 80 parts by weight, based upon 100 parts by weight of rubber. If in this range, the rubber composition of the present invention obtained exhibits good processability before vulcanization and exhibits a superior reinforcing effect after vulcanization.

Further, in the rubber composition of the present invention, instead of adding the surface-treated inorganic solid particles of the present invention, it is also possible to mix together the untreated inorganic solid particles and the polysiloxane composition of the present invention to obtain the same effect as with addition of the surface-treated inorganic solid particles of the present invention.

The contents in this case are 5 to 100 parts by weight, preferably 10 to 80 parts by weight, of the untreated inorganic solid particles, based upon 100 parts by weight of the rubber, and 0.1 to 30% by weight, preferably 1 to 20% by weight, converted to the weight of alkoxysilyl group-containing polysiloxane contained in the polysiloxane composition, of the polysiloxane composition of the present invention, based upon the weight of the inorganic solid particles.

The rubber composition of the present invention preferably further contains therein a silane coupling agent. The silane coupling agent usable in the present invention may be any silane coupling agent used together with a silica filler in the past. The representative examples are shown in the above Table I. Among these, bis-[3-(triethoxysilyl)-propyl] tetrasulfide or bis-[3-(triethoxysilyl)-propyl]disulfide is most preferred from the viewpoint of the processability. Further, the special silane coupling agents reacting with rubber at the time of vulcanization shown in Table B can be suitably used as well.

TABLE B

| Chemical name | Structural formula |
|---|---|
| 3-trimethoxysilylpropyl-N,N-dimethylthiocarbamoyl-tetrasulfide | $(CH_3O)_3SiC_3H_6S_4C(=S)N(CH_3)_2$ |
| Trimethoxysilylpropyl-mercaptobenzothiazole tetrasulfide | $(CH_3O)_3SiC_3H_6S_4$-benzothiazole |

TABLE B-continued

| Chemical name | Structural formula |
|---|---|
| Triethoxysilylpropyl-methacrylate-monosulfide | $(C_2H_5O)_3SiC_3H_6SC(=O)C(CH_3)=CH_2$ |
| Dimethoxymethylsilylpropyl-N,N-dimethylthiocarbamoyl tetrasulfide | $(CH_3O)_2Si(CH_3)C_3H_6S_4C(=S)N(CH_3)_2$ |

When blending a silane coupling agent in the rubber composition of the present invention, compared with the past, it is possible to reduce the amount of the silane coupling agent used and possible to further improve the abrasion resistance.

The amount of the silane coupling agent used in the present invention is preferably not more than 40% by weight, more preferably 0.5 to 40% by weight, particularly preferably 1 to 20% by weight, based upon the content of the surface-treated inorganic solid particles or inorganic solid particles not surface treated in the rubber composition of the present invention. If the amount of the silane coupling agent is too small, the desired effect becomes harder to obtain, while if too great, scorching more easily occurs in the mixing or extrusion process.

The rubber composition of the present invention may include, in addition to the above essential components, in a range not detracting from the object of the present invention, a vulcanization or cross-linking agent, vulcanization or cross-linking accelerator, various oils, antioxidants, plasticizers, and other various additives generally added for general rubber use or tire use. The formulation may be kneaded and vulcanized by a general method to obtain a composition and used for vulcanization or cross-linking. The amount of these additives may be made general conventional amounts in so far as it does not run counter to the object of the present invention.

The resin composition according to the second aspect of the present invention provides in a polysiloxane (C) in a composition of a resin (A) containing an inorganic filler (B) so as to prevent poor dispersion, settling, etc. of the inorganic filler (B). The components of the resin composition of the present invention will be explained below.

The resin (A) for a paint or adhesive used in the present invention is not particularly limited, but for example an alkyd resin, aminoalkyd, vinyl resin, acrylic resin, epoxy resin, urethane resin, (unsaturated) polyester resin, polyester acrylate resin, urethane acrylate resin, formalin condensation-based resin (for example, urea resin, urea-melamine resin, melamine resin, resol resin, novolak resin, resorcinol resin, xylene resin), polyamide resin, or polyimide-based resin may be mentioned. Among these, a resin selected from the group comprising a urethane resin, epoxy resin, acrylic resin, and melamine resin is preferable.

The urethane resin is not particularly limited so long as it is produced from a polyol compound and polyisocyanate and may be a single-ingredient type polyurethane resin composition or two-ingredient type polyurethane resin composition.

The polyol compound used in the present invention may be a polyether polyol, polyester polyol, other polyol, and mixed polyols of the same.

The polyether polyol includes, for example, a polyether polyol obtained by adding, to one or more of ethylene glycol, diethylene glycol, propylene glycol, dipropylene glycol, glycerin, 1,1,1-trimethylolpropane, 1,2,5-hexanetriol, 1,3-butanediol, 1,4-butanediol, 4,4'-dihydroxyphenyl propane, 4,4'-dihydroxyphenyl methane, pentaerythritol, or other polyhydric alcohol, one or more of propylene oxide, ethylene oxide, butylene oxide, or styrene oxide and a polyoxytetramethylene oxide. Specifically, for example, polypropylene glycol, polyoxypropylene glycol, polytetramethylene ether glycol, polyethylene glycol, and polyoxypropylene triol may be mentioned.

The polyester polyol includes, for example, a condensation polymer of one or more of ethylene glycol, propylene glycol, butanediol, pentanediol, hexanediol, cyclohexane dimethanol, glycerin, 1,1,1-trimethylolpropane, and other low molecular weight polyols with one or more of glutaric acid, adipic acid, pimelic acid, suberic acid, sebacic acid, terephthalic acid, isophthalic acid, or other low molecular weight carboxylic acids or oligomer acids or an open ring polymer such as propiolactone, valerolactone, or caprolactone.

Other polyols include low molecular weight polyols such as polymer polyols; polycarbonate polyols; polybutadiene polyols; hydrogenated polybutadiene polyols; acryl polyols; ethylene glycol, diethylene glycol, propylene glycol, dipropylene glycol, butanediol, pentanediol, and hexanediol.

The polyol compound used in the present invention is not limited to the above compounds, but preferably so-called PPG type polyols obtained by using glycerol or 1,1,1-trimethylol propane as a starting material and adding propylene oxide or ethylene oxide or polymer polyols obtained by adding acrylonitrile or styrene or other substances thereto to improve the heat resistance may be mentioned.

These may be used alone or in any combination thereof.

The polyisocyanate used in the present invention is not limited so long as it is a compound containing an isocyanate group at the end of the molecule. It is possible to use a polyisocyanate compound used in an ordinary polyurethane resin composition. Further, it is possible to use a urethane prepolymer composed of a reaction product obtained by a reaction of an excess amount of a polyisocyanate compound with a polyol compound and having an isocyanate group at the end of the molecule.

The polyisocyanate compound used in the present-invention includes, for example, an aromatic polyisocyanate such as 2,4-tolylene diisocyanate, 2,6-tolylene diisocyanate, phenylene diisocyanate, diphenylmethane diisocyanate, 1,5-naphthalene diisocyanate, tolidine diisocyanate, triphenylmethane triisocyanate, bicycloheptane triisocyanate, and tris(isocyanate phenyl)thiophosphate and hydrogenated compounds of the same; an aliphatic polyisocyanate such as ethylene diisocyanate, propylene diisocyanate, tetramethylene diisocyanate, hexamethylene diisocyanate, trimethylhexamethylene diisocyanate, 1,6,11-undecanetriisocyanate, and 1,3,6-hexamethylene triisocyanate; an alicyclic polyisocyanate such as isophorone diisocyanate; an aryl aliphatic polyisocyanate such as xylene diisocyanate and tetramethylxylene diisocyanate and hydrogenated compounds of the same; lysine diisocyanate; and lysine triisocyanate.

These may be used alone or in any combination thereof.

The urethane prepolymer used in the present invention may be produced by a reaction between an above polyol compound and an excess amount of a polyisocyanate compound. The ratio of mixture of the polyol compound and the polyisocyanate compound is preferably a ratio of the equivalent of the isocyanate groups in the polyisocyanate compound to the equivalent of the hydroxy groups in the polyol compound (NCO/OH) of 1.2 to 4.0, more preferably 1.5 to 2.4. If in the above range, the viscosity of the urethane prepolymer becomes suitable.

Further, the process of production of the urethane prepolymer used in the present invention may be a process similar to that of an ordinary urethane prepolymer. For example, it may be performed by heating and stirring at 50–100° C. the above ratio by weight of polyol compound and polyisocyanate compound. Further, it is possible to use a urethane catalyst such as an organotin compound, organic bismuth, or amine in accordance with need.

The epoxy resin is not particularly limited so long as it is an epoxy compound having at least two epoxy groups in its molecule.

For example, a bifunctional type glycidylether type epoxy resin such as a bisphenol A type, bisphenol F type, brominated bisphenol A type, hydrated bisphenol A type, bisphenol S type, bisphenol AF type, biphenol type, naphthalene type, fluorene type, polyalkylene glycol type, or alkylene glycol type; a polyfunctional type glycidylether type epoxy resin such as a phenol novolak type, orthocresol novolak type, DPP novolak type, trifunctional type, trishydroxyphenylmethane type, or tetraphenylolethane type; a synthetic aliphatic acid glycidylester type epoxy resin such as dimer acid; a glycidylamine type epoxy resin such as TGDDM, TGIC, hydantoin type, TETRAD-D type, aminophenol type, aniline type, or toluidine type; an alicyclic type epoxy resin; an epoxy resin having a sulfur atom at its epoxy resin main chain as represented by Flep 10 made by Toray Thiokol; a urethane-modified epoxy resin having a urethane bond; or polybutadiene, liquid polyacrylonitrile-butadiene rubber, or rubber containing NBR may be mentioned.

These may be used alone or in any combination thereof.

The acrylic resin is not particularly limited so long as it is a polymer or copolymer or acrylic acid, acrylic acid ester, acrylamide, acrylonitrile, methacrylic acid, methacrylic acid ester, etc., but in form a liquid or emulsion, particularly a solution state is preferred.

The melamine resin is not particularly limited so long as it is obtained by a condensation reaction between melamine and formaldehyde.

The molecular weight of the resin (A) used for the present invention, in the case of a urethane resin, is preferably 1000 to 20,000, more preferably 2000 to 15,000, in the case of an epoxy resin, is preferably 300 to 4000, more preferably 300 to 3000, and in the case of an acrylic resin, is preferably 500 to 10,000, more preferably 1000 to 5000. In the case of a melamine resin, there is no particular restriction on the molecular weight.

These resins are used without a solvent or along with a solvent or are used in an emulsion state. The viscosity of the resin (A) in the case where the molecular weight is in the above range is preferably 100 to 100,000 mPa·s (20° C.), more preferably 1000 to 50,000 mPa·s (20° C.).

The inorganic filler (B) used in the present invention includes, for example, a black filler and white filler. The black filler includes, for example, carbon blacks such as SAF, ISAF, HAF, XCF, FEF, GPF, SRF, FT, MT. The white filler includes, for example, silica (for example, anhydrous particulate silicic acid, hydrous particulate silicic acid, hydrous aluminum silicate, and hydrous calcium silicate), clays and talcs (for example, kaolin clay (kaolinite and halloysite), pyrophyllite clays, sericite clays, sintered clay, talc), carbonates (for example, basic magnesium carbonate, ultrafine calcium carbonate, light calcium carbonate, heavy calcium carbonate, and chalk) alumina hydrates (for example, hydrous aluminum hydroxide), diatomaceous earth, barium sulfate (for example, precipitated barium sulfate), mica, alumina sulfate, lithopone, asbestos, graphite, molybdenum disulfide, pumice powder, glass powder, silica sand, etc.

Further, the inorganic filler (B) used in the present invention may include a so-called inorganic pigment. The inorganic pigment may include oxides such as zinc white, titanium oxide, red iron oxide, chromium oxide, iron black, and composite oxides (for example, Titan Yellow, zinc-iron brown, titan-cobalt green, cobalt green, cobalt blue, copper-chrome black, copper-iron black); chromates such as yellow lead and molybdenum orange; ferrocyanides such as prussian blue; sulfides such as cadmium yellow, cadmium red, or zinc sulfide; sulfates such as barium sulfate; silicates such as ultramarine blue; carbonates such as calcium carbonate; phosphates such as manganese violet; hydroxides such as yellow iron oxide, etc. carbons such as carbon black; metal powders such as aluminum powder and bronze powder; and titanium covered mica.

Among these, silica is usually hard to redisperse once settling in a composition. As explained below, in the composition of the present invention, it is hard to settle and easy to redisperse even if settling. That is, when containing silica as a filler, the effect of the present invention is particularly remarkably exhibited. The same applies, when using silica and another filler as the inorganic filler (B). Therefore, the inclusion of at least silica as the inorganic filler (B) is a preferable embodiment of the present invention.

As suitable examples of the silica used in the present invention, hydrous silicic acid having a nitrogen specific area of 50 to 300 m²/g may be mentioned. AS specific examples of this silica, Carplex (Shionogi), Tokusil (Tokuyama), Starsil (Kamijima Kagaku), Silton (Mizusawa Chemical), Vulkasil (Bayer), and Ultrasil (Degussa) may be mentioned.

As the inorganic filler (B) the above-mentioned fillers may be used alone or in any combination thereof.

Further, the size of the inorganic filler (B) is not particularly limited, but in the case of silica, the average particle size is preferably 0.001 to 50 μm, more preferably 0.01 to 10 μm, from the viewpoint of the stability of dispersion.

The content of the inorganic filler (B) in the resin composition of the present invention is 0.5 to 100 parts by weight, preferably 5 to 80 parts by weight, based upon 100 parts by weight of the resin (A). If in the above range, the effect of imparting coloring, blocking, reinforcement, extension, weather resistance, conductivity, a magnetic property, and other properties in the paint, adhesive, sealant, etc. becomes sufficient.

The polysiloxane (C) used in the present invention is a polysiloxane of the above formula (III).

In the above formula (III), $R^6$ is at least one group selected from the group consisting of a methyl group, ethyl group, and propyl group. The m number of $R^6$'s may be the same or different. Among these, $R^6$ is preferably a methyl group or ethyl group in view of the superiority of the reactivity with the inorganic filler (B).

In the above formula III, $R^7$ is a hydrogen atom or monovalent organic group. The r number of $R^7$'s may be the same or different.

Further, q is an integer of 1 or more, while r is 0 or an integer of 1 or more. Therefore, the repeating unit having a methyl group and $OR^6$ group at the side chain is an essential component unit. The repeating unit having a methyl group and $R^7$ group (i.e., hydrogen atom or monovalent organic group) at the side chain is a component unit introduced, if necessary.

Considering the effect as a dispersant, the boiling point of the polysiloxane, etc., q+r is preferably an integer of 3 to 1000, more preferably an integer of 10 to 1000.

Among the above, a polysiloxane with a q+r of 10 to 50 is easy to obtain.

$R^6$ has the role of reacting with the inorganic filler (B). As opposed to this, while $R^7$ is not essential, the comparability with the resin (A) is raised and the stability of the dispersion of the inorganic filler may be increased. For an epoxy resin, $R^7$ is preferably an organic group containing polyether or glycidyl group. For example,

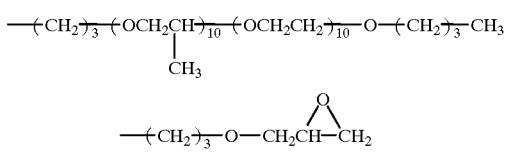

may be mentioned. For an acrylic resin, $R^7$ is particularly preferably an organic group containing an ester group. For example,

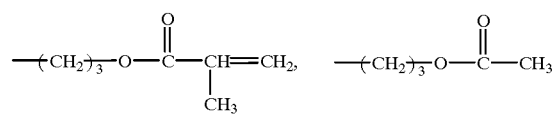

may be mentioned. For a melamine resin, $R^7$ is preferably an organic group having a functional group capable of forming a bond between the melamine resin and hydrogen such as a urea bond, amide bond, or urethane bond, as follows.

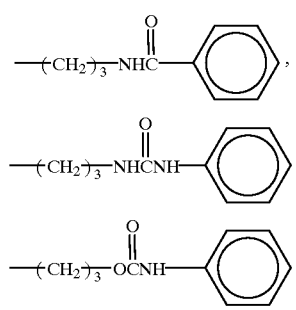

The polysiloxane (C) used in the present invention may be obtained by a conventional production process of a polysiloxane. For example, it is possible to synthesize it by causing a reaction between the methyl hydrogen polysiloxane of the following formula (IV) and at least one alcohol selected from the group comprised of methanol, ethanol, and propanol in the presence of a transition metal catalyst.

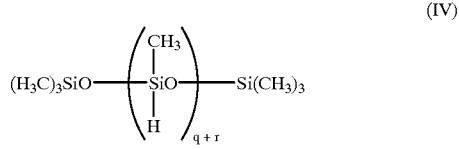

(IV)

The transition, metal catalyst includes, for example, a chloroplatinic acid, platinum-ether complex, platinum-olefin complex., $PdCl_2$ $(PPh_3)_2$, $RhCl$ $(PPh_3)$, a mixture of $CuO_2$ and $Me_2NCH_2—CH_2NMe_2$, tin octylate, and zinc octylate. A chlorine catalyst can be used, instead of a transition metal catalyst.

Further, various organic groups may be introduced into the polysiloxane (C). As the method of introducing an organic group into the polysiloxane (C), the method of causing a reaction with an organic compound having a double bond with the Si—H group of the polysiloxane using the above catalyst may be mentioned. As the organic compound having a double bond, for example, allyl methacrylate, allyl acetate, polyalkylene oxide monoallyl ether, N-allyl phenylamide, allylphenyl urea, allyl N-phenyl carbamate, ethylene, styrene, α-methylstyrene, α-methylstyrene dimer, chloromethylstyrene, acrylonitrile, allylglycidyl ether, phenylglycidyl ether, limonene, isooctene, and vinylcyclohexene may be mentioned.

The content of the polysiloxane (C) in the resin composition of the present invention is 0.1 to 30 parts by weight, preferably 1 to 20 parts by weight, based upon 100 parts by weight of the inorganic filler (B). If in the above range, the effect of the inorganic filler (B) as a dispersant or anti-settling agent becomes sufficient and the physical properties as a paint, adhesive, sealant, etc. become excellent.

The effect of the polysiloxane (C) as a dispersant and anti-settling agent will now be explained in the case of the resin composition of the present invention containing at least silica as the inorganic filler (B).

In the resin composition of the present invention, it is believed that, due to the inclusion of the polysiloxane (C), the silanol group of the silica mixed in the resin composition and the polysiloxane react and polysiloxane covers the surface of the silica. Therefore, no aggregation or settling of the silica caused by the aggregating force of the silanol groups occurs. Further, even if allowed to stand for a long period of time, etc. and settling, it can be easily redispersed with stirring, etc.

Japanese Unexamined Patent Publication (Kokai) No. 9-111044 discloses an invention preventing a decrease in the knit of the mixture of rubber by adding polysiloxane in a resin composition containing an elastomer and filler.

Here, since the rubber composition described in the publication is high in viscosity, there is no problem such as settling of the once dispersed filler. As opposed to this, the paint, adhesive, sealant, etc. in which the resin composition of the present invention is used is low in viscosity, and therefore, there is the problem of settling of the filler.

Further, when the resin composition of the present invention is used for a paint, it is required that the filler disperse to a high extent.

Due to the difference in these points, the polysiloxane used in the present invention is preferably a polysiloxane (C) having the formula (III) having a repeating group having a functional group increasing the compatibility with the resin.

The resin composition of the present invention is more superior in the stability of dispersion of the inorganic filler (B), due to the inclusion of the acid catalyst or base catalyst, in addition to the polysiloxane (C).

The acid catalyst includes, for example, sulfuric acid, hydrochloric acid, p-toluene sulfonic acid, and n-butyl phosphoric acid. The base catalyst includes, for example, a metal alkoxide such as potassium methoxide and sodium methoxide; a hydroxide compound such as lithium hydroxide, sodium hydroxide, and potassium hydroxide; and tetrabutylammonium hydroxide. These may be used alone or in any combination thereof. The content of the catalyst is preferably 0.1 to 10 parts by weight, based upon 100 parts by weight of the polysiloxane (C).

The resin composition of the present invention may contain other additives, in addition to the above components to an extent not detracting from the object of the present invention.

When the resin (A) is a urethane resin, the other additives include, for example, dibutyl phthalate, dioctyl phthalate, tetrahydrophthalic acid, azelaic acid, benzoic acid, phthalic acid, trimellitic acid, pyromellitic acid, adipic acid, sebacic acid, fumaric acid, maleic acid, itaconic acid, citric acid, and their derivatives, polyester, polyether, epoxy-based, paraffin-based, naphthene-based, and aromatic-based process oils and other plasticizers; a solvent such as toluene, xylene, hexane, and heptane; and a curing accelerator such as dioctyl tin dilaurate, dibutyl tin laurate, tin octylate, lead octylate, and tertiary amine.

When the resin (A) is an epoxy resin, a curing agent is included. The epoxy resin curing agent used in the present invention is not particularly limited so long as it is a curing agent capable of curing an epoxy resin. It is possible to use one ordinarily used, as a curing agent, for an epoxy resin adhesive. When the resin composition of the present invention is made a two-liquid type, for example, an amine-based curing agent, acid, or acid anhydrous based curing agent, basic active hydrogen compound, imidazoles, polymercaptane-based curing agent, phenol resin, urea resin, melamine resin, and isocyanate-based curing agent may be mentioned. When the resin composition of the present invention is a single-liquid type, for example various latent curing agents and UV curing agents may be mentioned.

As specific examples of an amine-based curing agent, an aliphatic polyamine such as ethylene diamine, diethylene triamine, or triethylene tetramine; an alicyclic polyamine such as isophorone diamine or 1,3-bisaminomethylcyclohexane; an aromatic polyamine such as diaminodiphenylmethane or diaminodiphenylsulfone; and an aliphatic polyamine including an aromatic ring such as methaxylene diamine may be mentioned. Further, an amine adduct (e.g. polyamine epoxy resin adduct), polyamine-ethylene oxide adduct, a reaction product of an aliphatic polyamine and ketone, that is, ketimine; a secondary amine or tertiary amine such as linear diamine, tetramethyl guanidine, triethanolamine, piperidine, pyridine, and benzyl dimethylamine; and a liquid polyamide obtained by a reaction between dimer acid and a polyamine such as diethylene triamine and triethylene tetramine may be mentioned.

As specific examples of the acid or acid anhydride-based curing agent, a polycarboxylic acid such as adipic acid, azelaic acid, and decane dicarboxylic acid; an aromatic acid anhydride such as phthalic anhydride, trimellitic anhydride, ethylene glycol bis(trimellitic anhydride), glycerol tris(trimellitic acid anhydride), pymellitic anhydride, and 3,3',4,4'-benzophenone tetracarboxylic anhydride; a cyclic aliphatic acid anhydride such as maleic anhydride, succinic anhydride, tetrahydro phthalic anhydride, and methyl tetrahydro phthalic anhydride; an aliphatic acid anhydride such as polyadipic anhydride, polyazelaic anhydride, polysebacic anhydride, dodecenyl succinic anhydride, and poly(ethyloctadecane dioxide) anhydride; and halogenated acid anhydrides such as chlorend anhydride, tetrabromo phthalic anhydride, and anhydrous hete anhydride.

As specific examples of the basic active hydrogen compound, a dicyan diamide and organic acid dihydrazide may be mentioned.

As specific examples of an imidazole, 2-methyl imidazole, 2-ethyl-4-methylimidazole, and 2-heptadecylimidazole may be mentioned.

As specific examples of a polymercaptane-based curing agent, a thioglycollic acid ester such as pentaerythritol tetrathioglycolate and dipentaerythritol hexathioglycolate and a compound containing a mercapto group such as polysulfide rubber having a mercapto group at its end may be mentioned.

As specific examples of an isocyanate-based curing agent, an isocyanate compound such as toluene diisocyanate, hexamethylene diisocyanate, and xylene diisocyanate and a block isocyanate compound obtained by masking the isocyanate group by a reaction with phenol, alcohol, caprolactum, etc. may be mentioned.

As the latent curing agent, for example, the reaction product of aliphatic polyamine with a ketone, that is, ketimine; a reaction product of an amine such as n-hexylamine, monoethylamine, benzylamine, diethylamine, piperidine, triethylamine, and aniline with borotrifluoride, that is, borotrifluoride-amine complexes; a dicyan diamide derivative such as dicyanodiamide or o-tolylbiguanide, $\alpha$-2,5-dimethylbiguanide, $\alpha,\omega$-diphenylbiguanide, and 5-hydroxynaphthyl-1-biguanide; an acid hydrazide such as hydrazide succinate, hydrazide adipate, hydrazide isophthalate, hydrazide p-oxybenzoate, hydrazide salicylate, and hydrazide phenylaminopropionate; diaminomaleonitrile or its derivatives; a melamine derivative such as diallyl melamine; an amine imide synthesized by a carboxylic acid ester, dimethyl hydrazide, and epoxy compound; a salt of a diamine such as ethylene diamine, hexamethylene diamine, and piperidine and aliphatic dicarboxylic acid such as sebacic acid, a salt of a polyamine such as 2,4,4-trimethyl-2,4,7-trihydroxyflavin and a polyhydroxyphenol such as N,N'-dimethyl-1,3-propane diamine, a phenylsulfonate of a polyamine, and a phenylphosphate of a polyamine; an ester compound of sulfonic acid and primary alcohol, monoester or diester or phosphoric acid or their mixtures, and an ester compound obtained by an addition reaction of a sulfonic acid and epoxy compound. Further, a UV curing agent such as an aromatic diazonium salt and aromatic sulfonium salt may be mentioned.

The content of the curing agent is preferably an amount giving a ratio of equivalents of 0.1 to 1.5 with respect to the epoxy groups in the epoxy resin, more preferably an amount giving 0.8 to 1.2. In this range, the curability and the resultant physical properties were excellent.

The additives other than the curing agent include, for example, dioctyl phthalate (DOP), dibutyl phthalate (DBP), dioctyl adipate, isodecyl succinate; a plasticizer such as diethylene glycol dibenzoate, pentaerythritol ester, butyl oleate, methyl acetyl ricinoleate, tricresyl phosphate, trioctyl phosphate, propylene glycol adipate polyester, and butylene glycol adipate polyester; a solvent such as ethyl acetate, methyl ethyl ketone (MEK), toluene, and xylene; a thixotropic agent such as Disparon made by Kusunokimoto Kasei; an antiaging agent such as hindered phenol; an antioxidant such as butylhydroxy toluene (BHT) and butylhydroxy anisole (BHA); an antistatic agent such as a hydrophilic compound such as quaternary ammonium salt, polyglycol, and ethylene oxide derivatives; a flame retardant such as chloroalkyl phosphate, dimethyl-methyl phosphonate, bromine-phosphorus compound, ammonium polyphosphate, neopentyl bromide polyether, or polyether bromide; and tackifier such as a terpene resin, phenol resin, terpene-phenol resin, rosin resin, and xylene resin.

When the resin (A) is an acrylic resin, the other additive may, for example, be a UV absorber. When the resin (A) is a melamine resin, the other additive may, for example, be sawdust, soybean meal glue, flour, or another powder.

The production process of the resin composition according to the present invention is not particularly limited. It is possible to use a process similar to that of an ordinary resin composition depending upon the resin (A) contained.

EXAMPLES

The present invention will be described in further detail below using Examples, but the technical scope of the present invention is, of course, not limited to these Examples.

Example I

Synthesis of Alkoxysilyl Group-Containing Polysiloxane 200 g of polymethyl hydrogen siloxane (KF99, made by Shin-Etsu Chemical) was dropwise added over 3 hours to a mixture of 180 g of ethanol and 200 $\mu$l of a 1% isopropyl alcohol solution of chloroplatinic acid. The mixture was further reacted at 80° C. for 10 hours. Next, the excess ethanol wag distilled off in vacuO. The conversion was 98%.

The alkoxysilyl group-containing polysiloxane thus obtained is believed to have the structure of the following formula:

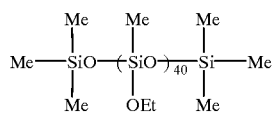

After the end of the reaction, 0.1 g of bis-[3-(triethoxysilyl)-propyl]tetrasulfide was added.

In the Tables I-1 to I-5 below, the alkoxysilyl group-containing polysiloxanes synthesized in the above way are described as polysiloxanes.

Examples I-1 to I-3 and Comparative Example I-1

The increase in the viscosity of the polysiloxane composition obtained by adding the alcohol to the alkoxysilyl group-containing polysiloxane was measured to evaluate the storage stability. The results are shown in Table I-1.

In Examples I-1 to I-3, the alcohol was added to the alkoxysilyl group-containing polysiloxanes synthesized above. In Comparative Example I-1, no alcohol was added. In the Tables, the units are parts by weight.

These polysiloxanes were evaluated for storage stability by finding the viscosity after standing for 7 days divided by the initial viscosity right after synthesis (measured at 20° C.).

The increase in viscosity was suppressed by adding ethanol and isopropanol to the alkoxysilyl group-containing polysiloxane.

TABLE I-1

|  | Comp. Ex. I-1 | Ex. I-1 | Ex. I-2 | Ex. I-3 |
|---|---|---|---|---|
| Polysiloxane | 100 | 100 | 100 | 100 |
| ethanol |  |  |  |  |
| Isopropanol |  | 3 | 5 | 5 |
| Initial viscosity (mPa.s) | 60.4 | 53.5 | 50.2 | 50.1 |
| Increase in viscosity (times) | 2.3 | 1.2 | 1.1 | 1.2 |

Example I-4 and Comparative Example I-2

In Example I-4, the moisture absorption rate of silica (Nipsil AQ, made by Nihon Silica) treated at 120° C. for 1 hour by a polysiloxane composition obtained in Example I-2 containing 5 parts by weight of ethanol and allowed to stand at 80° C. for 2 days was measured.

The treated silica was allowed to stand at 40° C. at a humidity of 80 RH % for 1 day. The weight after standing was divided by the weight after treatment to calculate the moisture absorption rate. The unit of the moisture absorption rate was %.

In Comparative Example I-2, the silica was treated with polysiloxane obtained at Comparative Example I-1 not containing the alcohol and allowed to stand at 80° C. for 2 days, at 120° C. for 1 hour, and the moisture absorption rate was measured. The results are shown in Table I-2.

In the Table, the units of the compounds are parts by weight.

The treated polysiloxane composition containing ethanol (i.e., Example I-4) was more effectively made hydrophobic at the surface of the silica and the moisture absorption rate dropped.

TABLE I-2

|  | Comp. Ex. I-2 | Ex. I-4 |
|---|---|---|
| Silica | 100 | 100 |
| Polysiloxane | 10 |  |
| Polysiloxane with 5 parts by weight ethanol |  | 10 |
| Moisture absorption rate (%) | 2.3 | 1.5 |

The following commercially available products were used for the other ingredients used in the formulations of the following Examples I-5 to I-8 and Comparative Examples I-3 to I-9.

Natural rubber: RSS#1

Solution polymerized SBR: End modified coupling treatment solution polymerized SBR, Nipol NS116 (made by Nippon Zeon)

Emulsion polymerized SBR: Nipol SBR1502 (made by Nippon Zeon)

Silica: Nipsil AQ (made by Nihon Silica)

Silane coupling agent: bis-[3-(triethoxysilyl)-propyl]tetrasulfide,

Si69 (made by Degussa)

Polysiloxane: Alkoxysilyl group-containing polysiloxanes synthesized above

Polysiloxane composition: Composition containing 5 parts by weight of ethanol based upon 100 parts by weight of the above polysiloxanes Diethylene glycol: Diethylene glycol (made by Kanto Chemical)

Zinc white: Zinc White No. 3

Stearic acid: Industrial Stearic Acid

Antioxidant: N-phenyl-N-(1,3-dimethylbutyl)-p-phenylene diamine

Powdered sulfur: 5% oil treated powdered sulfur

Vulcanization accelerator (DPG): Diphenyl guanidine

Vulcanization accelerator (CBS): N-cyclohexyl-2-benzothiazylsulfenamide

Preparation of Samples

The ingredients other than the vulcanization accelerator and powdered sulfur were mixed by a 1.8 liter internal mixer for 3 to 5 minutes. The mixture was discharged when reaching 165±5° C. The vulcanization accelerator and powdered sulfur were mixed with this master batch by an 8-inch open roll to obtain a rubber composition. The unvulcanized physical properties of the rubber composition thus obtained were determined. The composition was then press vulcanized in a 15×15×0.2 cm die at 160° C. for 20 minutes to prepare the desired test piece (i.e., rubber sheet) which was then evaluated as to the vulcanized physical properties.

The test methods for the unvulcanized physical properties and vulcanized physical properties of the compositions obtained in the Examples are as follows:

Unvulcanized Physical Properties
1) Scorch time: The time (min) by which the viscosity was increased 5 points was determined at 125° C. according to JIS K6300.
2) Unvulcanized viscosity: The Mooney viscosity was determined at 100° C. according to JIS K6300.
3) Vulcanization time: The time (min) until reaching a 95% vulcanization degree was determined at 160° C. according to JIS K6300.

Vulcanized Physical Properties
1) Tensile stress at 300% elongation, breaking strength, and elongation at break: Determined according to JIS K6251 (dumbbell shaped no. 3)
2) JIS hardness: Determined at 20° C. according to JIS K6253
3) tan δ (0° C.), tan δ (60° C.): A viscoelasticity spectrometer manufactured by Toyo 5eiki Seisakusho was used for determination under the conditions of 0° C. and 60° C., 10% elongation, and vibration of the amplitude±2% at a frequency of 20 Hz. The equation for the dynamic elasticity was found and the tanb was calculated from the ratio of the value of the real number part to the imaginary number part of the equation.
4) Abrasion resistance: Abrasion loss determined by a Lambourn tester and shown by an index Abrasion resistance (index)=[(Loss of Standard Example 10)/(Loss of sample)]×100

Example I-5 and Comparative Examples I-3 and I-4

These Examples show the results of evaluation of the polysiloxanes in systems using emulsion polymerized SBR as the rubber, containing silica, and not containing silane coupling agents. The results are shown in Table I-3.

Comparative Example I-4 is an example of further addition of polysilomane to Comparative Example 3. If polysiloxane is added, the unvulcanized viscosity falls and the vulcanization time is shortened compared with Comparative Example I-3.

Example I-5 is an example of the addition of the polysiloxane composition containing ethanol to Comparative Example I-3. Compared with Comparative Examples I-3 and I-4, the vulcanization time was shortened. Further, the tensile stress at 300% elongation, breaking strength, JIS hardness, abrasion resistance, and low heat buildup at 60° C. (tan δ (60° C.)) were improved over Comparative Examples I-3 and I-4.

TABLE I-3

|  | Comp. Ex. I-3 | Comp. Ex. I-4 | Ex. I-5 |
|---|---|---|---|
| Natural rubber | — | — | — |
| Solution polymerized SBR | — | — | — |
| Emulsion polymerized SBR | 100.00 | 100.00 | 100.00 |
| Silica | 50.00 | 50.00 | 50.00 |
| Silane coupling agent | — | — | — |
| Polysiloxane | — | — | 5.00 |
| Polysiloxane composition (polysiloxane + alcohol) | — | — | 5.00 |
| Diethylene glycol | 2.50 | 2.50 | 2.50 |
| Zinc white | 3.00 | 3.00 | 3.00 |
| Stearic acid | 1.00 | 1.00 | 1.00 |
| Antioxidant | 1.00 | 1.00 | 1.00 |
| Powdered sulfur | 1.50 | 1.50 | 1.50 |
| Vulcanization accelerator (DPG) | 0.30 | 0.30 | 0.30 |
| Vulcanization accelerator (CBS) | 1.00 | 1.00 | 1.00 |
| Unvulcanized physical properties |  |  |  |
| Scorch time (min) | >46.0 | >46.0 | >46.0 |
| Unvulcanized viscosity | 93.8 | 79.8 | 79.4 |
| Vulcanization time (min) | 55.7 | 24.9 | 20.4 |
| Vulcanized physical properties |  |  |  |
| Tensile stress at 300% elongation (MPa) | 1.3 | 3.4 | 4.0 |
| Breaking strength (MPa) | 4.0 | 22.2 | 23.5 |
| Elongation at break (%) | 931 | 791 | 790 |
| JIS hardness | 52.2 | 61.4 | 66.8 |
| tanδ (0° C.) | 0.204 | 0.285 | 0.315 |
| tanδ (60° C.) | 0.259 | 0.195 | 0.194 |
| Abrasion resistance (index) | 100.0 | 145.8 | 150.4 |

Example I-6 and Comparative Examples I-5 to I-6

These examples show the results of evaluation of the polysiloxanes in systems using emulsion polymerized SBR as the rubber, containing silica, and containing a silane coupling agent. The results are shown in Table I-4.

In Example I-6 containing a polysiloxane composition containing ethanol, the unvulcanized viscosity further fell and the abrasion resistance was improved compared with Comparative Examples I-5 and I-6.

TABLE I-4

|  | Comp. Ex. I-5 | Comp. Ex. I-6 | Ex. I-6 |
|---|---|---|---|
| Natural rubber |  |  |  |
| Solution polymerized SBR |  |  |  |
| Emulsion polymerized SBR | 100.00 | 100.00 | 100.00 |
| Silica | 50.00 | 50.00 | 50.00 |
| Silane coupling agent | 2.50 | 2.50 | 2.50 |
| Polysiloxane | — | 2.50 | — |
| Polysiloxane composition (polysiloxane + alcohol) | — | — | 2.50 |
| Diethylene glycol | 2.50 | 2.50 | 2.50 |
| Zinc white | 3.00 | 3.00 | 3.00 |
| Stearic acid | 1.00 | 1.00 | 1.00 |
| Antioxidant | 1.00 | 1.00 | 1.00 |
| Powdered sulfur | 1.50 | 1.50 | 1.50 |
| Vulcanization accelerator (DPG) | 0.30 | 0.30 | 0.30 |
| Vulcanization accelerator (CBS) | 1.00 | 1.00 | 1.00 |
| Unvulcanized physical properties |  |  |  |
| Scorch time (min) | >46.0 | >46.0 | >46.0 |
| Unvulcanized viscosity | 83.2 | 79.8 | 78.2 |
| Vulcanization time (min) | 25.9 | 24.6 | 24.3 |
| Vulcanized physical properties |  |  |  |
| Tensile stress at 300% elongation (MPa) | 7.7 | 9.3 | 8.3 |
| Breaking strength (MPa) | 24.9 | 24.1 | 24.2 |
| Elongation at break (%) | 677 | 570 | 607 |
| JIS hardness | 66.2 | 69 | 68.4 |
| tanδ (0° C.) | 0.276 | 0.283 | 0.287 |
| tanδ (60° C.) | 0.168 | 0.155 | 0.161 |
| Abrasion resistance (index) | 170.9 | 171.0 | 181.3 |

Example I-7 and Comparative Examples I-7 to I-8

These examples show the results of evaluation of the polysiloxanes in systems using natural rubber systems comprising solution polymerized SBR plus natural rubber as the rubber. The results are shown in Table I-5.

In Example I-7 containing a polysiloxane composition containing ethanol, the unvulcanized viscosity further fell and the tensile stress at 300% elongation, breaking strength, and low heat buildup at 60° C. (tan δ (60° C.)) were improved compared with Comparative Examples I-7 and I-8.

Example I-8 and Comparative Example I-9

These Examples show the results of evaluation of the polysiloxanes in systems containing natural rubber systems composed of solution polymerized SBR and natural rubber as the rubber, containing surface-treated silica, and containing a silane coupling agent. In Example I-8, as the surface-treated silica, silica treated on the surface with the ethanol-added polysiloxane obtained at Example I-4 was used. In Comparative Example I-9, silica treated on the surface with the polysiloxane obtained at Comparative Example I-2 was used. The results are shown in Table I-5.

In Example I-8 using silica treated on the surface with a polysiloxane containing ethanol, the scorch time became longer, the unvulcanized viscosity was decreased, and the vulcanization time was shortened compared with Comparative Example I-9. Further, the tensile stress at 300% elongation, breaking stress, elongation at break, JIS hardness, low heat buildup at 60° C. (tan δ (60° C.)), and abrasion resistance were improved over Comparative Example I-9.

TABLE I-5

|  | Comp. Ex. I-7 | Comp. Ex. I-B | Ex. I-7 | Comp. Ex. I-9 | Ex. I-8 |
|---|---|---|---|---|---|
| Natural rubber | 50.00 | 50.00 | 50.00 | 50.00 | 50.00 |
| Solution polymerized SBR | 50.00 | 50.00 | 50.00 | 50.00 | 50.00 |
| Emulsion polymerized SBR |  |  |  |  |  |
| Silica | 50.00 | 50.00 | 50.00 | — | — |
| Surface-treated silica (Comp. Ex. 2) | — | — | — | 52.5 | — |
| Surface-treated silica (Ex. 4) | — | — | — | — | 52.5 |
| Silane coupling agent | 2.50 | 2.50 | 2.50 | 2.50 | 2.50 |
| Polysiloxane | — | 2.50 | — | — | — |

TABLE I-5-continued

|  | Comp. Ex. I-7 | Comp. Ex. I-B | Ex. I-7 | Comp. Ex. I-9 | Ex. I-8 |
|---|---|---|---|---|---|
| Polysiloxane composition (polysiloxane + alcohol) | — | — | 2.50 | — | — |
| Diethylene glycol | 2.50 | 2.50 | 2.50 | 2.50 | 2.50 |
| Zinc white | 3.00 | 3.00 | 3.00 | 3.00 | 3.00 |
| Stearic acid | 1.00 | 1.00 | 1.00 | 1.00 | 1.00 |
| Antioxidant | 1.00 | 1.00 | 1.00 | 1.00 | 1.00 |
| Powdered sulfur | 1.50 | 1.50 | 1.50 | 1.50 | 1.50 |
| Vulcanization accelerator (DPC) | 0.30 | 0.30 | 0.30 | 0.30 | 0.30 |
| Vulcanization accelerator (CBS) | 1.00 | 1.00 | 1.00 | 1.00 | 1.00 |
| Unvulcanized physical properties |  |  |  |  |  |
| Scorch time (min) | 18.4 | 29.3 | 29.1 | 32.4 | 33.2 |
| Unvulcanized viscosity | 98.0 | 79.1 | 78.8 | 76.3 | 75.1 |
| Vulcanization time (min) | 20.6 | 23.1 | 22.0 | 22.2 | 21.8 |
| Vulcanized physical properties |  |  |  |  |  |
| Tensile stress at 300% elongation (NPa) | 9.4 | 10.0 | 10.9 | 10.8 | 11.2 |
| Breaking strength (MPa) | 20.4 | 19.2 | 20.6 | 21.0 | 21.5 |
| Elongation at break (%) | 520 | 446 | 474 | 460 | 470 |
| JIS hardness | 69.4 | 68.2 | 67.4 | 67.0 | 67.2 |
| tanδ (0° C.) | 0.516 | 0.536 | 0.520 | 0.524 | 0.532 |
| tanδ (60° C.) | 0.129 | 0.123 | 0.119 | 0.121 | 0.118 |
| Abrasion resistance (index) | 201.0 | 211.0 | 198.4 | 201.0 | 212.0 |

According to the first aspect of the present invention, by adding the specified alcohol to an alkoxysilyl group-containing polysiloxane, a polysiloxane composition superior in storage stability is obtained.

Further, according to the present invention, by adding to a rubber composition inorganic solid particles treated on the surface with an alkoxysilyl group-containing polysiloxane and containing alcohol, it is possible to improve the unvulcanized viscosity as shown in Examples I-5 to I-7 and possible to sufficiently shorten the vulcanization time. Further, the tensile stress at 300% elongation is improved and the abrasion resistance becomes a sufficiently high value.

Example II

Synthesis of Polysiloxane 1

A mixture of 80 g of ethanol and 40 μl of a 2.5% isopropyl alcohol solution of chloroplatinic acid was dropwise added slowly at 50° C. to 100 g of polymethyl hydrogen siloxane (KF99). After the completion of the dropwise addition, the mixture was allowed to react at 80° C. for 10 hours. The unreacted ethanol was removed to obtain the polysiloxane.

The polysiloxane 1 thus obtained is believed to be a compound having the following formula (3).

Synthesis of Polysiloxane 2

A mixture of 50 g of ethanol and 40 μl of a 2.5% isopropyl alcohol solution of chloroplatinic acid was slowly added at 50° C. to 100 g of polymethyl hydrogen siloxane (KF99). After the generation of hydrogen gas became mild, the mixture was allowed to react at 80° C. for 4 hours. Next, 50 g of allylglycidyl ether and 20 μl of a 2.5% isopropyl alcohol solution of chloroplatinic acid were added and the mixture allowed to react at the same temperature for 4 hours.

The polysiloxane 2 thus obtained is believed to be a compound having the following formula (4).

Synthesis of Polysiloxane 3

A mixture of 50 g of ethanol and 40 μl of a 2.5% isopropyl alcohol solution of chloroplatinic acid was slowly added at 50° C. to 100 g of polymethyl hydrogen siloxane (KF99). After the generation of hydrogen gas became mild, the mixture was allowed to react at 80° C. for 4 hours. Next, 170 g of ethylene glycol monoallyl ether (Uniox PKA-5006, made by Nihon Yushi Co.) and 20 μl of a 2.5% isopropyl alcohol solution of chloroplatinic acid were added and the mixture was allowed to react at the same temperature for 4 hours.

The obtained polysiloxane 3 is believed to be a compound having the following formula (5).

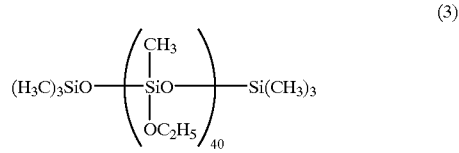

(3)

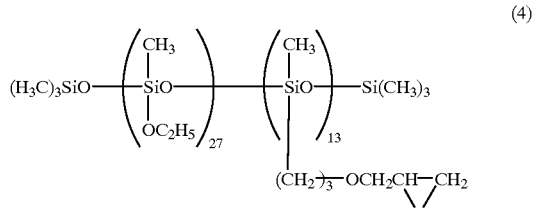

(4)

-continued

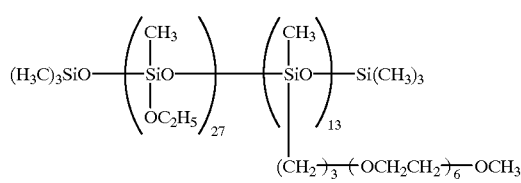
(5)

Preparation of Resin Composition

The materials shown below were used for the preparation of various resin compositions.

(1) Resin (A)
  (i) Urethane polymer: Urethane polymer obtained by mixing 500 g of polypropylenediol of an average molecular weight of 2000, 750 g of polypropylenetriol of an average molecular weight of 5000, and 214 g of 4,4'-diphenylmethane diisocyanate (NCO/OH=1.8), further adding 1460 g of dioctyl phthalate, and causing a reaction in an $N_2$ stream at 80° C. while stirring (containing 1.1% by weight of isocyanate group).
  (ii) Epoxy resin: YD128, made by Toto Kasei K.K., epoxy equivalent 190
  (iii) Acrylic resin emulsion: EX-16, made by Nippon Shokubai, 33% by weight solid content
(2) Epoxy resin curing agent: Polyamide L-55-3, made by Sanyo Chemical Industries
(3) Inorganic filler (B)
  (i) Silica: Nipsil AQ, made by Nihon Silica
  (ii) Calcium carbonate: Searetsu 200, made by Maruo Calcium
  (iii) Carbon black; MA-600, made by Mitsubishi Kagaku
  (iv) Red iron oxide (iron oxide-based red pigment): Iron dioxide (III), made by Bengara Kogyo
(4) Solvent (xylene)
(5) Polysiloxane (C): Polysiloxanes 1 to 3 obtained above
(6) Silane coupling agent Compound having the following formula (6) obtained by a room temperature reaction between vinyl trimethoxysilane and thioglycollic acid.

$$(H_3CO)_3SiCH_2CH_2SCH_2COOH \qquad (6)$$

Example II-1 and Comparative Example II-1

The materials shown in Table II-1 were dry blended in the ratios of weight shown in Table II-1 to obtain urethane resin compositions.

Example II-2 and Comparative Example II-2

The materials shown in Table II-1 were mixed under stirring in the ratios of weight shown in Table II-1 at ordinary temperature in vacuo (20 Torr or less) by a high viscosity mixer to obtain epoxy resin compositions.

Example II-3 and Comparative Example II-3

The materials shown in Table II-1 were mixed under stirring in the ratios of weight shown in Table II-1 to obtain acrylic resin compositions.

Evaluation of Dispersion Stability

The resin compositions thus obtained were evaluated for the dispersion stability of the inorganic filler. The dispersion stability was evaluated by stirring the compositions obtained, then allowing them to stand for 48 hours and observing the state of dispersion of the filler.

The results are shown in Table II-1

The resin composition of the present invention contains a specific polysiloxane, and therefore no settling of an inorganic filler is seen (Examples II-1 to II-3).

As opposed to this, when not containing the specific polysiloxane, settling of the inorganic Eiller wag seen in all cases (Comparative Examples II-1 to II-3).

TABLE II-1

|  | Examples | | | Comparative Examples | | |
| --- | --- | --- | --- | --- | --- | --- |
|  | II-1 | II-2 | II-3 | II-1 | II-2 | II-3 |
| Composition |  |  |  |  |  |  |
| (A) Resin |  |  |  |  |  |  |
| Urethane prepolymer | 100 | — | — | 100 | — | — |
| Epoxy resin | — | 100 | — | — | 100 | — |
| Acrylic resin emulsion | — | — | 100 | — | — | 100 |
| Epoxy resin curing agent | — | 30 | — | — | 30 | — |
| (B) Inorganic filler |  |  |  |  |  |  |
| Silica | 10 | 10 | 10 | 10 | 10 | 10 |
| Calcium carbonate | 60 | — | — | 60 | — | — |
| Carbon black | 1 | — | — | 1 | — | — |
| Red iron oxide | — | 3 | 3 | — | — | — |
| Solvent | 50 | 50 | — | 50 | 50 | — |
| (C) Polysiloxane |  |  |  |  |  |  |
| Polysiloxane 1 | 2 | — | — | — | — | — |
| Polysiloxane 2 | — | 2 | — | — | — | — |
| Polysiloxane 3 | — | — | 2 | — | — | — |
| Silane coupling agent | 0.5 | — | — | 0.5 | — | — |

TABLE II-1-continued

| | Examples | | | Comparative Examples | | |
|---|---|---|---|---|---|---|
| | II-1 | II-2 | II-3 | II-1 | II-2 | II-3 |
| Physical properties Dispersion stability | Does not settle | Does not settle | Does not settle | Silica and calcium carbonate settle | Silica and bengara settle | Silica precipitates in cake form |

The resin composition according to the second aspect of the present invention makes poor dispersion, aggregation, settling, etc. of the filler harder and makes redispersion easier by stirring etc. even when the filler settles, and therefore, is suitable for use for a resin composition for a paint, adhesive, sealant, etc.

What is claimed is:

1. A resin composition comprising (A) 100 parts by weight of a resin for a paint or adhesive, (B) 0.5 to 100 parts by weight of an inorganic filler, and (C) 0.1 to 30 parts by weight, based upon 100 parts by weight of the component (B), a polysiloxane having the following formula (III):

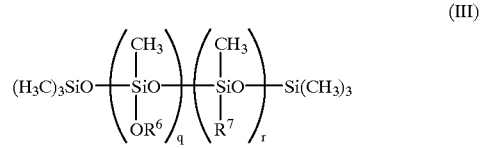

(III)

wherein, $R^6$ is at least one group selected from the group consisting of a methyl group, ethyl group and propyl group provided that q number of $R^6$s may be the same or different, $R^7$ is a hydrogen atom or a monovalent organic group and r number of $R^7$'s may be the same or different, q is an integer of 1 or more, and r is 0 or an integer of 1 or more.

2. A resin composition as claimed in claim 1, wherein the resin (A) for a paint or adhesive is a resin selected from the group consisting of urethane resins, epoxy resins, acrylic resins, and melamine resins.

3. A resin composition as claimed in claim 1, wherein the inorganic filler (B) contains at least silica.

* * * * *